G. I. BERGEN.
Corn-Planter.
No. 46,629.
Patented Mar 7. 1865.
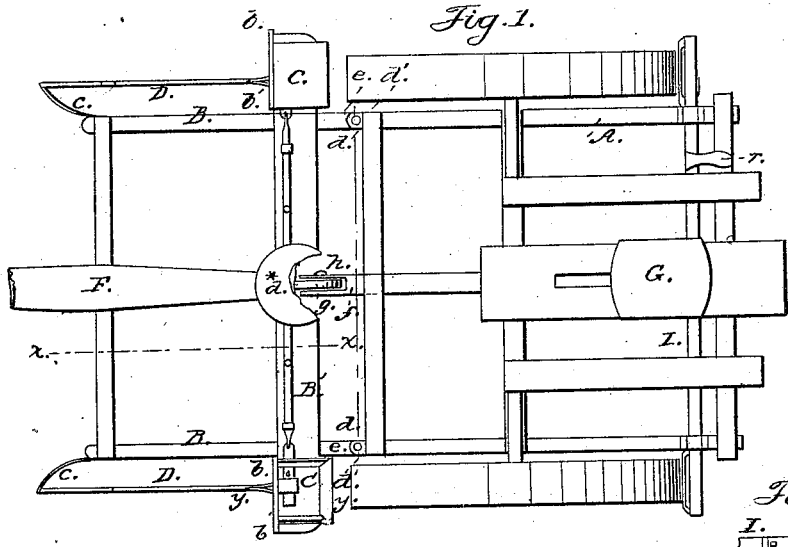
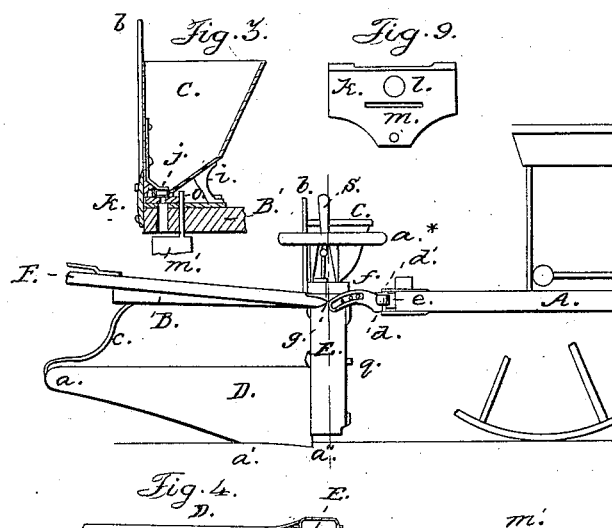
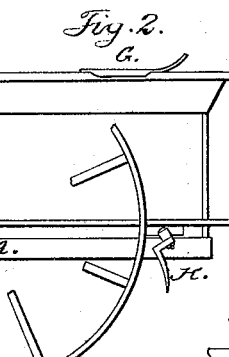
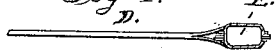
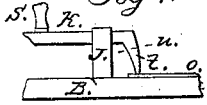
Witnesses:
E. R. McKean
P. J. Dodge
Inventor:
Geo. I. Bergen
By his attys.
Smith & Dodge.

UNITED STATES PATENT OFFICE.

GEORGE I. BERGEN, OF GALESBURG, ILLINOIS.

IMPROVEMENT IN CORN-PLANTERS.

Specification forming part of Letters Patent No. 46,629, dated March 7, 1865.

*To all whom it may concern:*

Be it known that I, GEORGE I. BERGEN, of Galesburg, in the county of Knox and State of Illinois, have invented certain new and useful Improvements in Machines for Planting Corn; and I do hereby declare that the following is a full, clear, and exact description thereof, reference being had to the accompanying drawings, making part of this specification, and to the letters of reference marked thereon, in which—

Figure 1 is a plan view of the machine; Fig. 2, a longitudinal vertical section, taken in the line of $x\,x$, Fig. 1; Fig. 3, a vertical section of one of the seed-hoppers in the line $y\,y$, Fig. 1; Fig. 4, a transverse horizontal section of one of the seed-tubes in the line $z\,z$, Fig. 5; Fig. 5, a rear elevation of the same; Fig. 6, a plan view of the seed-slide and cut-off; Fig. 7, a front elevation of a portion of the rod and stop for operating the slide, and Fig. 8 a rear view of one of the scrapers.

The nature of my invention consists, first, in a runner of peculiar construction; second, in a novel method of uniting the front and rear frames of the machine; third, in a peculiar guide for insuring the planting of the corn in hills forming rows both ways; fourth, in a hopper of novel construction, together with special devices adapted thereto; fifth, in a seed-tube of peculiar make; sixth, in a special arrangement for operating the slides; seventh, in a new style of making and arranging the scrapers; and, eighth, in a special arrangement of the dropper's seat.

To enable others skilled in the art to construct and use my invention, I will proceed to describe it more in detail.

My machine is of that class intended to be drawn by a team, planting two rows of corn at once, in hills, and to be operated by two persons, one driving and the other operating the planting mechanism by hand.

The body of the machine consists of a front frame, B, mounted on runners, and a rear frame, A, mounted on wheels, the two frames being united by a flexible joint so arranged that it can be rendered rigid under certain circumstances.

D represents the runners, which have their lower edges from $a$ to $a'$ made concave instead of convex or straight, as is usual, the portion from $a'$ to $a''$ increasing gradually in width vertically toward its rear end, whereby the heel $a''$ is made to cut deeper into the earth than any other portion of the runner. These runners are made of steel, and have their lower edges sharpened. Their front ends are secured to the frame B by means of the curved braces $c$, their rear ends being united to the seed-tube E, as shown in Fig. 4. The object of making the runners thus is threefold—first, the concave edge gathers and presses down upon the ground the stalks, weeds, and litter that may chance to be in its path, so that in passing over them it is more certain to cut through them into the ground; second, by making it wider and sharp at the heel $a'''$ a small deep gash is cut at the bottom of the furrow, from which moisture is more readily furnished for germinating the seed and continuing its growth; and, third, by uniting it to the tube in the manner shown their surfaces are brought flush on the sides, where they unite, whereby the soil is prevented from adhering to the front of the tube and interfering with its operation, as it does in those cases where a shoulder or jog is left at the union of the two parts.

The front and rear frames are united at the sides by a joint composed of the two parts $d$ and $e$, which allows of a short vertical movement of one frame independent of the other. At their central portion they are united by means of the two metallic pieces $f$ and $g$, the former being bolted to the rear and the latter to the front frame, as shown in plan, Fig. 1. The front end of $f$ is curved and slotted, as shown in Fig. 2, while the rear end of $g$ is provided with a series of holes to receive the pin $h$, by which $f$ and $g$ are united. The driver's seat G is made adjustable, which enables the machine to be properly balanced by the weight of the driver, be the same more or less. Another advantage of having it adjustable is that the driver can thus throw more or less pressure upon the runners to suit the variations in the condition of the soil in different parts of the field, some portions being harder than other portions, and hence requiring more pressure to cut the furrow of proper depth at such places. It also enables him to balance the machine properly and adapt it to a dropman of varying weights—as, for instance, whether the dropman be a man or a boy. As the joint formed by pin $h$ is some distance in front of a line passing through the joints in the sides of the frame formed by $d\,e$, it follows that when the dropman dismounts, as is the custom in turning at the ends of the rows, the weight of the driver acting on frame A as a lever whose fulcrum is the axle, the front end of said lever, which is the curved end of $f$, operates to lift the rear portion of frame B, with its runners, clear from the ground, so that the machine can be turned about upon its wheels, like a cart. When this is done it is obvious that a portion of the weight of frame B, through the medium of the tongue F, would be brought to bear upon the necks of the animals, if no provision were made for preventing it. It will be seen, however, that when the bar $f$ begins to elevate the frame B the movement soon brings the piece $e$ of the side joints up against the plate $d'$, whereby the side joints are locked or rendered rigid, and that when this is accomplished any further movement of $f$ upward will lift not only the rear of frame B, but the entire frame, tongue and all, and that thus the necks of the animals can be entirely relieved from pressure.

It is desirable that the movement required to render the side joints rigid should always be uniform, or as nearly so as possible. It is obvious that as pin $h$ is moved forward the length of $f$, acting as a lever in connection with frame A, of which it forms a part, would be increased, and that then a less movement of the rear portion of frame A would be required to render the side joints rigid. This I obviate by curving the front end of $f$ and the slot therein, as shown, it being apparent that as pin $h$ is placed in a hole farther forward it occupies a lower position in the slot, whereby hinge $e$ is forced farther down upon the pin $d$, so that the distance which $e$ will have to move in order to come in contact with plate $d'$ will be increased in exactly the same ratio that the length of $f$ has been increased, and thus the movement of the rear portion of frame A and of the driver is at all times the same.

The pieces $f$ and $g$ are both made of cast-iron and bolted to the under side of their respective frames A and B, as shown in Fig. 1, the front end of $g$ being cast with side flanges projecting downward, so as to embrace the rear end of the tongue F, which is thus held firmly in place and prevented from being split. The frames rigid may be increased or decreased at pleasure.

In machines of this kind it has hitherto been the practice to use a single point, usually the end of a stick projecting over the side of the frame, as a guide for the eye in determining the precise instant for operating the seed-slide. In such case it is obvious that if the dropman's head be moved either forward or backward the slide will be operated correspondingly too late or too soon, and that hence the hills will not be planted exactly opposite to each other in the various rows, which run at right angles to the line of the machine's movement. To obviate this difficult I use a guide composed of two points, $b$ and $b'$, so that in bringing them both in range, or in line with the eye of the dropman, he is prevented from moving his head either forward or backward without being instantly informed of the same. It is obvious that a plane vertical surface may be used as a guide with the same results, the eye ranging along said surface from side to side, the operation being the same as in taking aim with the sights of a gun, or along the side of a wall or building. In Figs. 1, 2, and 3 this guide is shown attached to the front of the hopper; but it is obvious that it may be secured in any manner or at any other point, provided it be located in proper relation to the dropman's seat. By the use of such a guide I am enabled to plant hills with a degree of accuracy hitherto unattainable.

C represents the hopper for containing the seed, Fig. 3 being a vertical section of the same, with the seed-slide and other parts in position. This hopper I construct of cast-iron in a single piece in the form shown, with the leg $i$, by which it is supported on its rear side, the bottom of $i$ being provided with a suitable flange having a hole therein to receive a bolt, as shown. The front and rear sides of the bottom of hopper C are made converging, as shown, leaving an open channel at the bottom just wide enough to receive the cut-off $j$.

A cast-iron plate, $k$, of the form shown in Fig. 9, is made of sufficient width to extend from the front of bar B$'$ back under the foot of $i$. This plate is provided with a flange on its front edge, which projects both upward and downward, the lower portion serving to bolt it securely to the front of bar B$'$, while the upper portion is provided with a shoulder upon which the lower front edge of the hopper rests, the the hopper being secured to plate $k$ by means of two bolts, as shown in Fig. 3. A hole, $l$, for the seed to pass through, is made in plate $k$, and also a slot, $m$, for the stem of valve $m'$ to work in, as the latter is moved to and fro by the slide $o$, a notch in the edge of $o$ being provided to receive the stem of $m'$, and in which it rests loosely. The shoulder upon the rear side of the upper flange of plate $k$, upon which the front edge of the hopper rests, keeps the bottom of the hopper up from the surface of plate $k$, so as to leave a space between them of sufficient size to receive the slide $o$, the leg $i$ being made of proper length to bring the bottom of the hopper parallel with the upper surface of plate $k$. The cut-off $j$ is secured by a suitable stem attached to the inside of the hopper, so as to bring it in proper position in the channel in the bottom of the hopper, and may be made adjustable, if desired.

In Fig. 3, $b$ represents the planting-guide attached to the front of the hopper, its lower end resting upon the upper flange of plate $k$. By this method of constructing the hopper and the bed-plate $k$, upon which it rests, I secure a very firm, strong, and compact device, one that is not effected by the weather, as it cannot swell, warp, or shrink, so as to affect the working of the seed-slide, which has heretofore been a source of much trouble in this class of implements. By giving the bottom of the hopper the form indicated the corn is all fed down upon the slide o by its own gravity, whereby I am enabled to plant nearly every kernel out of the hopper, there seldom being more than five or six left, and to dispense with all pins, stems, or other devices, so frequently necessary to agitate or stir up the corn and prevent it from clogging.

E represents the seed-tube, which is also constructed of cast-iron. This tube is cast in two pieces, being divided vertically, as shown in Figs. 4 and 5. Lugs are cast on the rear side for bolting or riveting the parts firmly together, as shown, the front edge being provided with a flange projecting forward from each of the parts where they come in contact, which is straddled by the rear end of runner D, through which rivets pass transversely, serving the double purpose of uniting the two parts of the tube in front, and also securing the runner firmly thereto, as shown in plan in Fig. 4, the space in the rear portion of the runner not occupied by the flange on the front of the tube being filled in with wood. The upper end of the tube E is cast with a flange on its two sides, as shown in Fig. 5, by which it is securely bolted to the under side of bar B'. The two parts are so cast as to leave an elongated opening in the rear side of the tube, as shown in Fig. 5, a projection, $p$, being cast upon one of the parts to receive the end of bolt $q$, upon which the valve $m'$ is pivoted. By this construction of tube E, I am enabled to provide a very perfect device, which can be easily and firmly secured to the other parts, ready for instant operation. The opening in the rear side of the tube, and which should be of such a size that the kernels of corn will not escape through it, enables the driver, sitting upon his seat G, to see the valves $m'$, and thereby at all times to detect any failure in the latter to operate. As heretofore arranged, it has been difficult to remove the valve $m'$ when the latter, as frequently the case, became inoperative by clods, sticks, or similar substances being caught in the bottom of tube E. By my arrangement the valve $m'$ is held simply by the bolt $q$, the stem at its upper end resting loosely in a notch in the edge of slide o, as shown in Fig. 3. By withdrawing the bolt $q$ the valve $m'$ can be readily withdrawn from the bottom of tube E, and as readily replaced whenever desired.

H represents the scraper, the plan of which is clearly shown in Fig. 8. These scrapers are of iron or steel, and have their body made of V shape, its central portion being left open or cut away, as shown, thus leaving an open space slightly wider than the face of the tire on the wheel. One of these scrapers is placed in rear of each wheel, as usual, and they are firmly secured to a bar, I, by their upper bent portion, as shown in Fig. 2. This bar is so mounted on the frame A as to turn easily in its bearings, and has attached to it a short lever, $r$, as shown in Fig. 1. When it is desired to operate them the driver, sitting on his seat G, presses his foot on the lever $r$, which rotates the bar I so as to bring the scrapers in contact with the wheels. The scrapers being so attached to the bar I as to throw their weight forward of the point of attachment of bar I to frame A, it follows that when the driver removes his foot from lever $r$ the weight of the scrapers causes the bar I to resume its original position, thereby automatically removing the scrapers from contact with the wheels. By having the scrapers made with the open space in the center, as shown, the soil which would otherwise become packed upon their face or front side, and thereby prevent the edge from coming in contact with the wheel, is prevented from so doing, and thus my scraper is at all times in perfect condition for operating successfully.

Instead of using a lever for operating the seed-slides, I use the sliding rod K, provided with the handles S. This rod I mount upon two standards, J, which are firmly secured to bar B', as shown, a short distance inside from either hopper C. At each end K has a bent arm, $t$, which projects down and connects with the slide o. On the inside of the arm $t$ a shoulder, $u$, is provided, as shown in Fig. 7, which, as it comes in contact with standard J, limits the movement of rod K, and consequently of the seed-slides also. By this means the operating mechanism is all located above the bar B', where it is not liable to be obstructed by stalks, weeds, &c., which frequently interfere with the operation of the machines in the field when constructed in the ordinary way.

It will be seen by Fig. 2 that the dropman's seat $a^*$ is so located that a perpendicular line from the center of the seat will pass in rear of the heel $a''$ of the runner, as indicated by the red line. By this arrangement the heel of the runner forms a fulcrum upon which the weight of the driver operates through the medium of frame B acting as a lever to elevate the front of the tongue F, which is rigidly attached to said frame, and thereby relieves the necks of the horses from the pressure that would otherwise be brought upon them, and which is a serious objection in most machines of this class.

Hitherto great difficulty has been experienced in using rubber as a cut-off in seed-planters, it often happening that one or more kernels would be caught between the under surface of the rubber and the slide, and, becoming embedded in the yielding rubber, would stick there, and thus greatly impede the operations of the slide. It also frequently happens that some of the kernels, as they fall or are crowded into the cell in the seed-slide, stand on end and project above the slide in such a manner that when brought suddenly in contact with the edge of the cut off the kernel is broken or crushed, by which its value as seed is destroyed, as seed when thus injured will not germinate, and this difficulty is still more likely to occur where a hard substance is used to form the cut-off as is done in many machines. I entirely obviate these difficulties by using a rubber cut-off the diameter of which is just equal, or very nearly so, to the diameter of the seed-cell.

Fig. 6 is a plan view of the seed-slide o, the cell being represented by v, and the rubber cut-off j being shown by the red lines. It will be readily seen that if a kernel projects above the slide it will simply be caught between the edge of the rubber and the side of the cell, the rubber yielding sufficiently to prevent the kernel from being crushed. It follows that the kernel is simply held in that position until by the reverse movement of the slide it is liberated, when it readily falls down upon its side within the cell, from whence it passes down into the seed-tube upon the return movement of the slide. By this means I produce a perfectly-operating device, one which neither injures the seed nor is injured by the seed.

With these various improvements all combined in one machine I am enabled to produce an implement that accomplishes the desired result in a most perfect manner, and that obviates the numerous difficulties which have heretofore existed, to a greater or less extent, in nearly or quite all planters of this kind.

Having thus fully described my improvements, what I claim as new therein and of my invention, and for which I desire to secure Letters Patent, is—

1. The runner D, having a concave edge along its front part, and a slightly-descending straight edge from $a'$ to $a''$, as shown and described.

2. Uniting the front and rear frames of a corn-planter by means of the curved slotted bar $f$ and bar $g$, in combination with the loose joint $d\ c$.

3. A guide for planting, consisting either of two points or a broad plane surface, substantially as set forth.

4. The hopper C, when constructed as herein set forth.

5. The plate $k$, when constructed and used as and for the purposes described.

6. The scrapers H, constructed as described, and mounted on the roller I in such a manner as to automatically remove themselves from contact with the wheels, as and for the purpose set forth.

7. The seed tube E, when constructed as shown and described.

8. The rubber cut-off $j$, when constructed and operating as herein set forth.

9. The sliding rod K, having the bent arms $t$, and operating in conjunction with the standards J and seed-slides $o$, as and for the purpose set forth.

10. Pivoting the valve $m'$ on the removable pin $q$, and having the stem of said valve resting loosely in a notch, $o'$, in the edge of the seed-slide outside of the hopper, all arranged and operating as herein described.

GEORGE I. BERGEN.

Witnesses:
W. C. DODGE,
JNO. D. PATTEN.